(12) United States Patent
Edwards et al.

(10) Patent No.: US 12,105,795 B2
(45) Date of Patent: Oct. 1, 2024

(54) COMPUTER-BASED SYSTEMS CONFIGURED FOR UTILIZATION OF A TRAINED DETECTION MACHINE LEARNING MODEL FOR ACTIVITY DETERMINATION AND METHODS OF USE THEREOF

(71) Applicant: Capital One Services, LLC, McLean, VA (US)

(72) Inventors: Joshua Edwards, Philadelphia, PA (US); Asher Smith-Rose, Midlothian, VA (US); Tyler Maiman, Melville, NY (US); Shabnam Kousha, Washington, DC (US)

(73) Assignee: Capital One Services, LLC, McLean, VA (US)

( * ) Notice: Subject to any disclaimer, the term of this patent is extended or adjusted under 35 U.S.C. 154(b) by 233 days.

(21) Appl. No.: 17/894,922

(22) Filed: Aug. 24, 2022

(65) Prior Publication Data

US 2024/0073258 A1 Feb. 29, 2024

(51) Int. Cl.
*G06F 21/55* (2013.01)
*G06N 20/00* (2019.01)
*H04L 9/40* (2022.01)
*H04L 65/1076* (2022.01)
*H04L 65/1104* (2022.01)

(52) U.S. Cl.
CPC ............ *G06F 21/55* (2013.01); *G06N 20/00* (2019.01); *H04L 63/1483* (2013.01); *H04L 65/1076* (2013.01); *H04L 65/1104* (2022.05)

(58) Field of Classification Search
CPC ...................................................... G06F 21/55
See application file for complete search history.

(56) References Cited

U.S. PATENT DOCUMENTS

| | | | |
|---|---|---|---|
| 2016/0028754 A1* | 1/2016 | Cruz Mota | H04L 63/1458 726/23 |
| 2018/0060581 A1* | 3/2018 | El-Moussa | G06F 21/554 |
| 2019/0356679 A1* | 11/2019 | Sites | H04L 63/1416 |
| 2019/0377873 A1* | 12/2019 | Murphy | H04L 63/20 |

* cited by examiner

*Primary Examiner* — Bradley W Holder
(74) *Attorney, Agent, or Firm* — Greenberg Traurig, LLP

(57) ABSTRACT

In some embodiments, the present disclosure provides an exemplary method that may include steps of obtaining a permission to monitor a plurality of activities executed within the second computing device; continuously monitoring the plurality of activities executed within the second computing device for a predetermined period of time; receiving an indication of an incoming interaction session within the predetermined period of time; automatically verifying at least one session interaction parameter associated with the incoming interaction session to identify the incoming interaction session as a suspect interaction session; determining when a duration of time associated with the suspect interaction session meets or exceeds a predetermined duration threshold; utilizing a trained detection machine learning model to model a confidence value associated with the suspect interaction session; identifying at least one future activity subsequent to the suspect interaction session; and automatically instructing the first computing device to halt the future activity.

20 Claims, 7 Drawing Sheets

COMPUTER-BASED SYSTEMS CONFIGURED FOR UTILIZATION OF A TRAINED DETECTION MACHINE LEARNING MODEL FOR ACTIVITY DETERMINATION AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to computer-based platforms and systems configured for utilization of a trained detection machine learning model for activity determination and methods of use thereof.

BACKGROUND OF TECHNOLOGY

Typically, a fraudulent caller may take advantage of susceptible users using phone calls to procure funds from the user in the form of gift cards, which are very difficult to trace, by gaining the trust and proprietary information associated with the user through a plurality of phone calls called vishing attacks.

SUMMARY OF DESCRIBED SUBJECT MATTER

In some embodiments, the present disclosure provides an exemplary technically improved computer-based method that includes at least the following steps: obtaining, by at least one processor of a first computing device associated with a user, via at least one graphical user interface (GUI) having at least one programmable GUI element, a permission from the user to monitor a plurality of activities executed within the computing device; continually monitoring, by the at least one processor of the first computing device, in response to obtaining the permission from the user, the plurality of activities executed within the computing device for a predetermined period of time; identifying, by the at least one processor of the first computing device, an indication of an incoming interaction session being initiated with the user within the predetermined period of time; automatically verifying, by the at least one processor of the first computing device, at least one session interaction parameter associated with the incoming interaction session to identify the incoming interaction session as a suspect interaction session when the at least one session interaction parameter of the incoming interaction session is not associated with at least one of a particular entity, a particular individual, or a particular physical location based on a database of known session interaction parameters; determining, by the at least one processor of the first computing device, when a duration of time associated with the suspect interaction session meets or exceeds a predetermined duration threshold; utilizing, by the at least one processor of the first computing device, a trained detection machine learning model, when the duration of time associated with the suspect interaction session meets or exceeds the predetermined duration threshold, to model a confidence value associated with the suspect interaction session based on at least one first pre-determined type activity that is associated with the user and identified by a second computing device within the duration of time of the suspect interaction session; and wherein the second computer device is programmed to: identify, in response to the confidence value score meeting or exceeding a pre-determined confidence threshold, at least one future activity subsequent to the suspect interaction session, wherein the at least one future activity is a second pre-determined type activity and related to the at least one first pre-determined type activity; and automatically halt the at least one future activity of the computing device based on the at least one session interaction parameter of the suspect interaction session and at least one pre-determined trigger parameter.

In some embodiments, the present disclosure provides an exemplary technically improved computer-based system that includes at least the following components of at least one processor configured to execute software instructions that cause the at least one processor to perform steps to: obtain, via at least one graphical user interface (GUI) having at least one programmable GUI element, a permission from the user to monitor a plurality of activities executed within the computing device; continually monitor, in response to obtaining the permission from the user, the plurality of activities executed within the computing device for a pre-determined period of time; identify, an indication of an incoming interaction session being initiated with the user within the predetermined period of time; verify at least one session interaction parameter associated with the incoming interaction session to identify the incoming interaction session as a suspect interaction session when the at least one session interaction parameter of the incoming interaction session is not associated with at least one of a particular entity, a particular individual, or a particular physical location based on a database of known session interaction parameters; determine when a duration of time associated with the suspect interaction session meets or exceeds a predetermined duration threshold; utilize, when the duration of time associated with the suspect interaction session meets or exceeds the predetermined duration threshold, a trained detection machine learning model to model a confidence value associated with the suspect interaction session based on at least one first pre-determined type activity that is associated with the user and identified by a second computing device within the duration of time of the suspect interaction session; and wherein the second computer device is programmed to: identify, in response to the confidence value score meeting or exceeding a pre-determined confidence threshold, at least one future activity subsequent to the suspect interaction session, wherein the at least one future activity is a second pre-determined type activity and related to the at least one first pre-determined type activity; and automatically halt the at least one future activity of the computing device based on the at least one session interaction parameter of the suspect interaction session and at least one pre-determined trigger parameter.

BRIEF DESCRIPTION OF DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
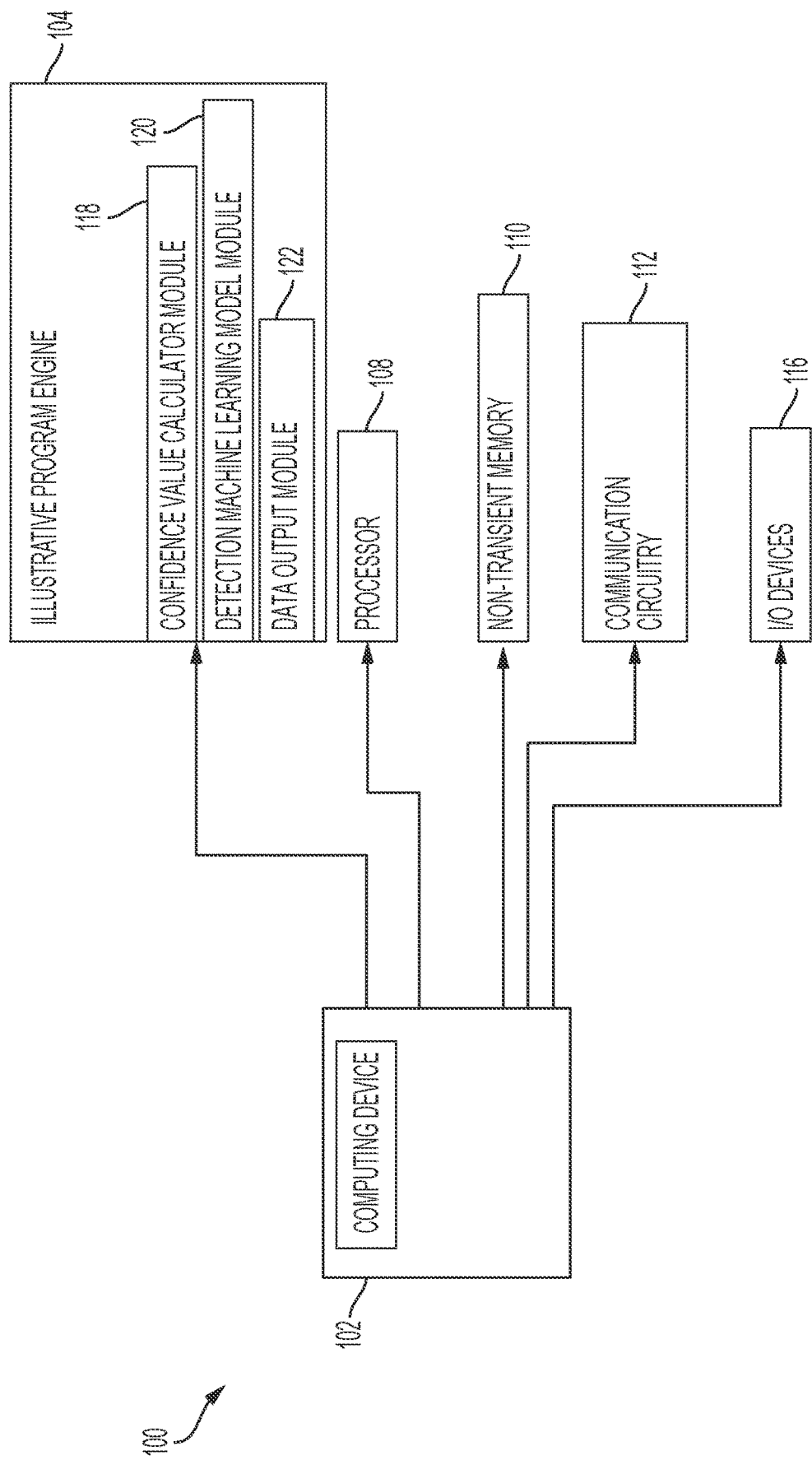
FIG. 1 depicts a block diagram of an exemplary computer-based system and platform for identifying a future activity subsequent to a suspect interaction session and automatically halting the future activity based a session interaction parameter, in accordance with one or more embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein, the terms "and" and "or" may be used interchangeably to refer to a set of items in both the conjunctive and disjunctive in order to encompass the full description of combinations and alternatives of the items. By way of example, a set of items may be listed with the disjunctive "or", or with the conjunction "and." In either case, the set is to be interpreted as meaning each of the items singularly as alternatives, as well as any combination of the listed items.

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, daily, several days, weekly, monthly, etc.

As used herein, the term "runtime" corresponds to any behavior that is dynamically determined during an execution of a software application or at least a portion of software application.

Embodiments of the present disclosure recognize technological computer-centered problems may arise when computer technology may be utilized by fraudsters to engage in various types of technology facilitated fraudulent attacks. As used herein, in some embodiments, the term vishing may refer to a fraudulent act or a security attack using verbal or audio scams or schemes to trick individuals into performing certain actions believed as done in their best interest or protection. Typically, in vishing, fraudsters may try to convince unsuspecting individuals to provide valuable information or extract a transaction of funds via a suspect interaction session (e.g., a fraudulent phone call). The valuable information can include, without limitation, any sensitive information (that can be further used for additional social engineering), credit card numbers, credentials, full legal names, birthdates, home addresses, billing addresses, mother's maiden names, phone numbers, credit card information, financial information, login credentials, and the like. This technical problem is exacerbated when the susceptible user provides funds via obscure method such as prepaid gift cards of predetermined amounts due to an inability to trace a transaction stream with the obscure method. In some instances, the user provides funds during at least one incoming interaction session that is automatically verified as a suspect interaction session based on at least one session interaction parameter and a duration associated with the suspect interaction session exceeding a predetermined threshold of duration. Typically, vishing attacks may be sophisticated and require thorough research and a phishing setup to work. In some instances, vishing is just one form of phishing, which is any type of message such as an email, text, phone call or direct-chat message that appears to be from a trusted source but isn't. Typically, one computer-based telecommunication technological problem, involving vishing or any other type of phishing attacks, may be due to the fact that computer-based telecommunication technology may make it easier to contact more people. For example, scammers may place hundreds of calls at a time using voice over internet protocol (VoIP) technology and can spoof the caller ID to make the call appear to come from a trusted source, such as one's bank.

Embodiments of the present disclosure detail a computer-centric technological solution that may automatically prevent a future transfer of funds based on the session interaction parameter of the suspect interaction session and at least one pre-determined trigger parameter. In some embodiments, a second computing device is programmed to identify the future activity subsequent to the suspect interaction session prior to automatically preventing the performance of the future activity. In some embodiments, a practical solution may require a trained detection machine learning model to model a confidence value associated with the suspect interaction session based on at least one first pre-determined type activity that is associated with the user and identified by the second computing device within the duration of time of the suspect interaction session.

FIG. 1 depicts a block diagram of an exemplary computer-based system and platform for identifying a future activity subsequent to a suspect interaction session and automatically halting the future activity based a session interaction parameter, in accordance with one or more embodiments of the present disclosure.

In some embodiments, a computing system 100 may include a computing device 102 associated with a user and an illustrative program engine 104. In some embodiments, the program 104 may be stored on the computing device 102 such as, without limitation a calling-enabled computing device (e.g., smart phone, iPad™ with calling capability, laptop with calling capability, etc.). In some embodiments, the illustrative program engine 104 may reside, partially or in full, on a server computing device 106 (not shown). In some embodiments, the computing device 102 may include a processor 108, a non-transient memory 110, a communication circuitry 112 for communicating over a communication network 114 (not shown), and input and/or output (I/O) devices 116 such as a keyboard, mouse, a touchscreen, and/or a display, for example. In some embodiments, a second computing device (not shown) may communicate with the computing device 102.

In some embodiments, the illustrative program engine 104 may be configured to instruct the processor 108 to execute one or more software modules such as a confidence value calculator module 118, machine learning model module 120, and a data output module 122.

In some embodiments, an exemplary detection machine learning model module 120, of the present disclosure, utilizes at least one machine learning algorithm described herein, to model a confidence value associated with a suspect interaction session, identify at least one future activity subsequent to the suspect interaction session, and automatically halt the at least one future activity based on the at least one session interaction parameter and at least one pre-determined trigger parameter. Typically, the suspect interaction session takes advantage of a user by procuring a transfer of funds from an account of the user to a second user (i.e. scammer), where the transfer of funds may refer to an activity. In some embodiments, the transfer of funds of a predetermined amount may refer to a pre-determined type activity, where this pre-determined type activity may be, without limitations, a transfer of a pre-paid gift card, transfer of login credentials, transfer of credit card information, etc. For example, the scammer may extract two pre-paid gift cards from an unexpected user via the suspect interaction session, where one has a value of $125 and the other has a value of $75, however both are in increments of $25 dollars. In another example, the scammer may extract login credentials and credit card information from the unsuspected user to transfer a predetermined amount from an account associated with the user to an account associated with the scammer. In some embodiments, the transfer of the pre-paid gift card may be difficult to trace and prevent, which leads the exemplary detection machine learning model module 120 failing to prevent the pre-determined type activity. In some embodiments, the exemplary detection machine learning model module 120 may obtain a permission from the user to monitor a plurality of activities executed within the computing device 102. In some embodiments, the exemplary detection machine learning model module 120 may continually monitor the plurality of activities executed within the computing device 102 for a predetermined period of time in response to obtaining the permission from the user. In some embodiments, the exemplary detection machine learning model module 120 may identify an indication of an incoming interaction session being initiated with the user within the predetermined period of time. In some embodiments, the incoming interaction session may refer to an incoming phone call. In some embodiments, the exemplary detection machine learning model module 120 may automatically verify at least one session interaction parameter associated with the incoming interaction session to identify the incoming interaction session as a suspect interaction session. In some embodiments, the suspect interaction session may refer to a fraudulent phone call from the scammer.

In some embodiments, the exemplary detection machine learning model module 120 may identify the incoming interaction session as the suspect interaction session when the session interaction parameter is not associated with at least one of a particular entity, a particular individual, or a particular physical location based on a database of known session interaction parameters. In some embodiments, the exemplary detection machine learning model module 120 may determine when a duration of time associated with the suspect interaction session meets or exceeds a predetermined duration threshold. In some embodiments, the pre-determined duration threshold may refer to an average duration of phone calls associated with verified suspect interaction sessions. In some embodiments, the exemplary detection machine learning model module 120 may model a confidence value associated with the suspect interaction session based on at least one first pre-determined type activity that is associated with the user and identified by the second computing device within the duration of time of the suspect interaction session.

In some embodiments, the exemplary detection machine learning model module 120 may utilize the confidence value calculator module 118 to calculate the confidence value that may be used to model the first pre-determined type activity associated with the suspect interaction session. In some embodiments, the exemplary detection machine learning model module 120 may identify a future activity subsequent to the suspect interaction session. In some embodiments, the future activity may refer to a second pre-determined type activity and related to the first pre-determined activity. In some embodiments, the exemplary detection machine learning model module 120 may automatically halt the future activity based on the at least one session interaction parameter of the suspect interaction session and at least one pre-determined trigger parameter. In some embodiment, the pre-determined trigger parameter may refer to a frequency of transactions associated with the at least one first pre-determined type activity. In some embodiments, the exemplary detection machine learning model module 120 may store a plurality of the pre-determined type activities associated with the suspect interaction session within the second computing device. In some embodiments, the second computing device may refer to the server computing device 106. In some embodiments, output of the exemplary detection machine learning model module 120 may be an instruction to automatically halt the future activity of the computing device 102. In some embodiments, the output of the exemplary detection machine learning model module 120 may be the calculated confidence value based on the confidence value calculator module 118.

In some embodiments, the confidence value calculator module 118 may calculate the confidence value by receiving a plurality of preferences associated with the user and compiling the plurality of preferences into the calculated confidence value. In some embodiments, the confidence value calculator module 118 may generate a predetermined threshold of confidence based on the complication of the plurality of preferences associated with the user. In some embodiments, the confidence value calculator module 118 may determine that the calculated confidence value meets or exceeds the predetermined threshold of confidence associated with the plurality of preferences associated with the user.

In some embodiments, the data output module 122 may identify the future activity subsequent to the suspect interaction session. In some embodiments, the data output module 122 may automatically halt the at least one future activity of the computing device 102 based on the at least one session interaction parameter of the suspect interaction session and the at least one pre-determined trigger parameter. In some embodiments, the data output module 122 may display the instruction to automatically halt the future activity of the computing device 102. In some embodiments, the data output module 122 may display the output of the exemplary detection machine learning model module 120.

In some embodiments, the non-transient memory 110 may store the identified future activity associated with the suspect interaction session. In some embodiments, the non-transient memory 110 may store the output of the exemplary detection machine learning model module 120. In some embodiments, the non-transient memory 110 may store the output of the data output module 122. In some embodiments, the non-transient memory 110 may store the calculated confidence value as output of the confidence value calculator module 118.

In some embodiments, the processor 108 may obtain a permission from the user to monitor a plurality of activities executed within the computing device 102. In some embodiments, the processor 108 may continually monitor the plurality of activities executed within the computing device 102 for a predetermined period of time. In some embodiments, the processor 108 may identify an indication of an incoming interaction session being initiated with the user within the predetermined period of time. In some embodiments, the processor 108 may automatically verify at least one session interaction parameter associated with the incoming interaction session to identify the incoming interaction session as the suspect interaction session when the at least one session interaction parameter of the incoming interaction session is not associated with at least one of a particular entity, a particular individual, or a particular physical location based on a database of known session interaction parameters. In some embodiments, the processor 108 may determine when the duration of time associated with the suspect interaction session meets or exceeds the predetermined duration threshold. In some embodiments, the processor 108 may utilize a trained machine learning model, when the duration of time associated with the suspect interaction session meets or exceeds the predetermined duration threshold, to model the confidence value of the confidence value calculator module 118. In some embodiments, the confidence value may be associated with the suspect interaction session based on the at least one first pre-determined type activity that is associated with the user and identified by the second computing device within the duration of time of the suspect interaction session. In some embodiments, the processor 108 may identified at least one future activity subsequent to the suspect interaction session in response to the confidence value score meeting or exceeding a predetermined confidence threshold. In some embodiments, the processor 108 may atomically halt the at least one future activity of the computing device 102 based on the at least one session interaction parameter of the suspect interaction session and the at least one pre-determined trigger parameter.

Figure 2:
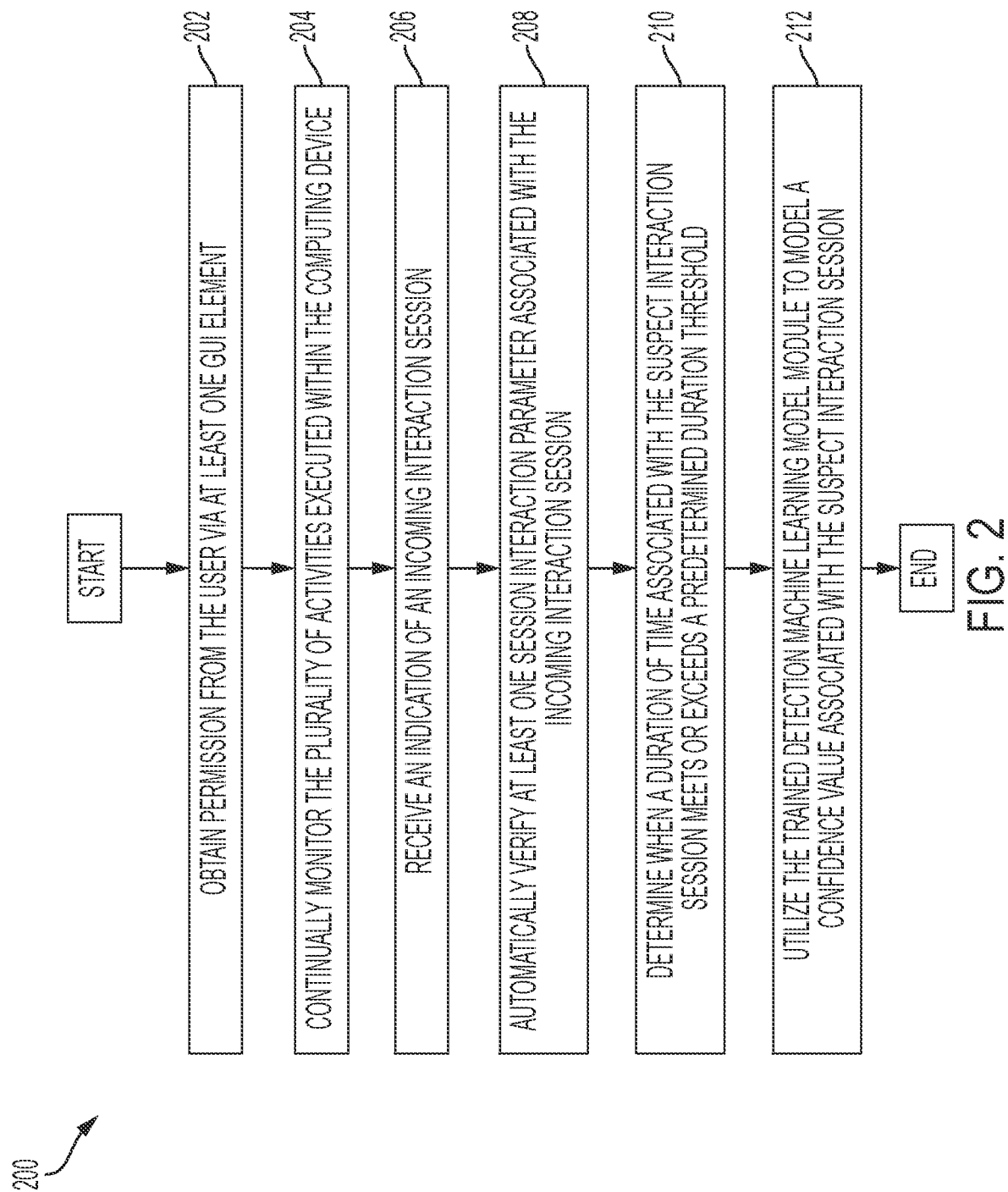
FIG. 2 is a flowchart illustrating operational steps for identifying future activity subsequent to a suspect interaction session and automatically halting the future activity based on a session interaction parameter, in accordance with one or more embodiments of the present disclosure.

FIG. 2 is a flowchart 200 illustrating operational steps for identifying a future activity subsequent to a suspect interaction session and automatically halting the future activity based a session interaction parameter, in accordance with one or more embodiments of the present disclosure.

In step 202, the illustrative program engine 104 within the computing device 102 may be programmed to obtain permission from the user via at least one graphical user interface (GUI) element. In some embodiments, the permission may allow the illustrative program engine 104 to monitor a plurality of activities executed within the computing device 102.

In step 204, the illustrative program engine 104 may continually monitor the plurality of activities executed within the computing device 102 for a predetermined period of time. In some embodiments, the monitoring of the plurality of activities may occur in response to the illustrative program 104 engine obtaining permission form the user.

In step 206, the illustrative program engine 104 may receive an indication of an incoming interaction session. In some embodiments, the indication of the incoming interaction session may be initiated with the user within the predetermined period of time. In some embodiments, the indication of the incoming interaction session being initiated with the user may refer to an indication of an incoming phone call, received from a telephonic module of the computing device 102.

In step 208, the illustrative program engine 104 may automatically verify at least one session interaction parameter associated with the incoming interaction session. In some embodiments, the automatic verification of the at least one session interaction parameter may identify the incoming interaction session as a suspect interaction session. In some embodiments, the illustrative program engine 104 may identify the incoming interaction session as the suspect interaction session when the at least one session interaction parameter of the incoming interaction session is not associated with at least one of a particular entity, a particular individual, or a particular physical location based on a database of known session interaction parameters. In some embodiments, the at least one session interaction parameter may refer to a session initiation protocol certificate associated with the suspect interaction session.

In step 210, the illustrative program engine 104 may determine when a duration of time associated with the suspect interaction session meets or exceeds a predetermined duration threshold. In some embodiments, the predetermined duration threshold may refer to an output of a plurality of parameters associated with the user for the incoming interaction session.

In step 212, the illustrative program engine 104 may utilize the trained detection machine learning model module 120 to model a confidence value associated with the suspect interaction session. In some embodiments, the exemplary detection machine learning model module 120 may model the confidence value associated the suspect interaction session based on at least one first pre-determined type activity that is associated with the user and identified by a second computing device within the duration of time of the suspect interaction session. In some embodiments, the exemplary detection machine learning model module 120 may model the confidence value associated with the suspect interaction session when the duration of time associated with the suspect interaction session meets or exceeds the predetermined duration threshold. In some embodiments, illustrative program engine 104 may utilize the trained detection machine learning model module 120 to identify at least one transaction associated with at least one gift card of a predetermined value.

In some embodiments, the illustrative program engine 104 may identify at least one future activity subsequent to the suspect interaction session in response to the confidence value score meeting or exceeding the predetermined confidence threshold. In some embodiment, the exemplary detection machine learning model module 120 may identify at least one future activity subsequent to the suspect interaction session in response to the confidence value score meeting or exceeding the predetermined confidence threshold. In some embodiments, the at least one future activity may refer to a second pre-determined type activity and may be related to the at least one first pre-determined type activity.

In some embodiments, the illustrative program engine 104 may automatically halt the at least one future activity of the computing device 102. In some embodiments, the exemplary detection machine learning model module 120 may automatically halt the at least one future activity of the computing device 102. In some embodiments, the exemplary detection machine learning model module 120 may automatically halt the at least one future activity based on the at least one session interaction parameter of the suspect interaction session and at least one pre-determined trigger parameter. In some embodiments, the second computing device may refer to the server computing device 106. In some embodiments, the illustrative program engine 104 may store a plurality of transactions associated with the user within the server computing device 106. In some embodiments, the future activity may refer to a transaction using a gift card associated with the at least one first predetermined type activity by a different user. In some embodiments, the at least one predetermined trigger parameter may refer to a frequency of transactions associated with the at least one first predetermined type activity.

Figure 3:
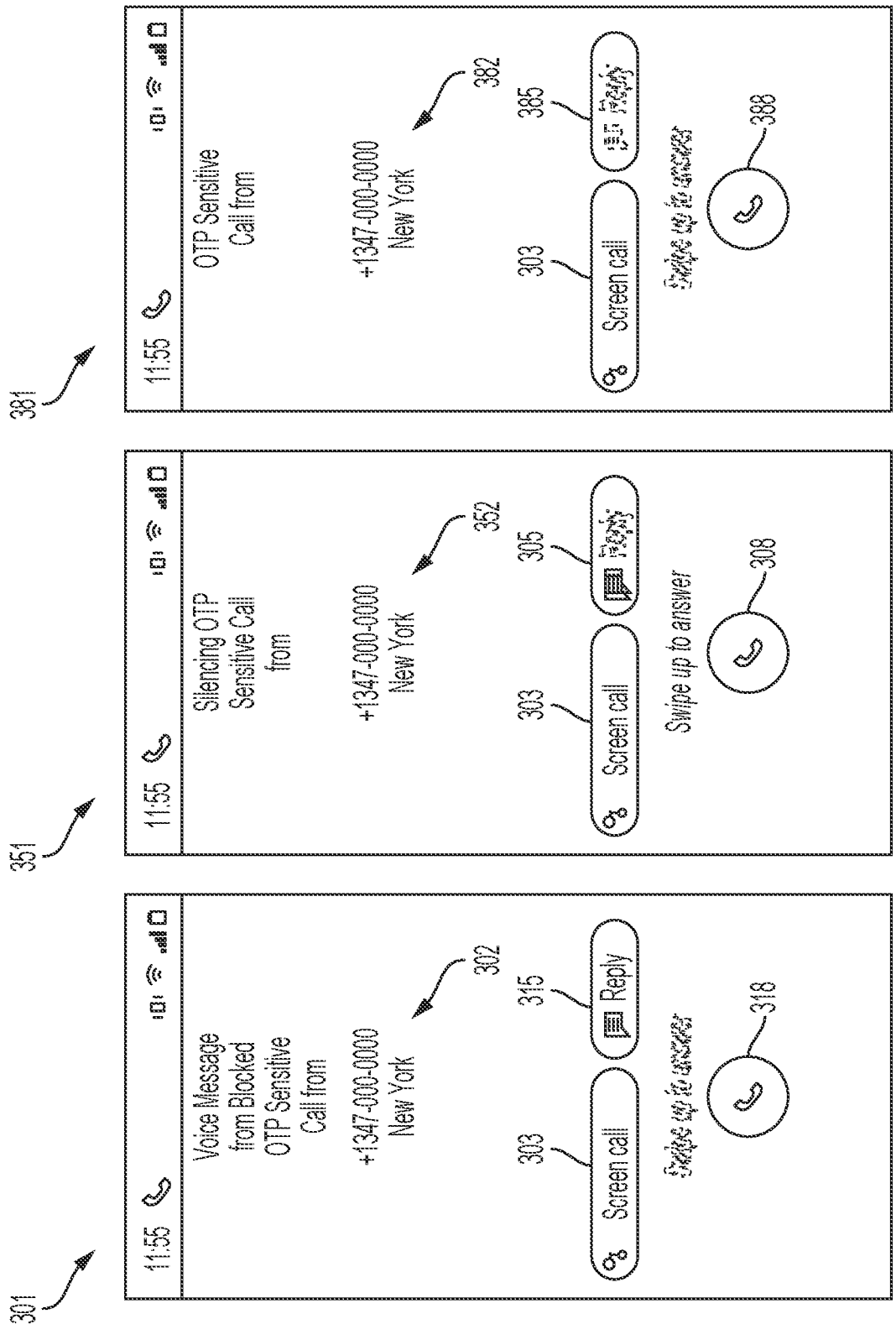
FIGS. 3A-3C are diagrams illustrating exemplary graphical user interfaces (GUIs) involving aspects and features associated with identifying a future activity subsequent to a suspect interaction session and automatically halting the future activity based a session interaction parameter, consistent with exemplary aspects of certain embodiments of the present disclosure.

FIGS. 3A-3C are diagrams illustrating exemplary graphical user interfaces (GUIs) involving aspects associated with an exemplary session interaction parameter protection (e.g., anti-vishing session interaction parameter protection), consistent with exemplary aspects of certain embodiments of the present disclosure. In some embodiments, the GUIs may be provided by an application and shown on a display of a mobile device (e.g., the computing device 102 of FIG. 1). In some embodiments, prior to the GUIs being displayed in response to an incoming call at the mobile device, a session interaction parameter has been received at the mobile device to activate, for example, the application into applying security measures for the incoming call suspicious of being associated with a vishing attack (e.g the suspect interaction session), and the like. In some embodiments, when the session interaction parameter becomes invalid after its preconfigured lifetime expires, the application may be deactivated at least to the extent that the triggered security measures would be no longer active due to the fact that there would be no valid session interaction parameters for any fraudulent entities to attack. The embodiment illustrated in FIGS. 3A-3C may correspond to another protection flow path, where the user would receive an incoming phone call from one of the phone numbers determined by, for example, the session interaction parameter protection machine learning model, as session interaction parameter sensitive, and would not have answered it yet.

FIG. 3A illustrates an exemplary GUI 301 of the application for notifying the user of a voice message from an incoming call that is currently blocked. The GUI 301 may include an alert 302, and a set of buttons 303 for the user to select, as well as options 315, and 318 disabled given that the call is currently being blocked. Here, the alert 302 may notify the user that the voice message has been identified as from a session interaction parameter sensitive call (e.g., the call identified as coming from an entity determined as presenting a security risk with regard to the valid session interaction parameter received). The alert 302 may include the phone number of the calling entity, i.e., "1-347-000-0000," and "New York" as the area associated with the phone number's area code.

As illustrated at GUI 301, the application would be actively blocking the incoming call in protection against the detected/potential vishing attack against the valid session interaction parameter. In some embodiment, the user no longer can interact with the selectable options 315 or 318 to perform certain actions when the blocked call is a pending incoming call. As shown here, the user no longer can select the option 315 to reply with a message, or select the option 318 to swipe up to answer the blocked call. In some embodiments, the user can select the button 303 to screen the blocked call. In some embodiments, the user can select the button 303 to screen the voice message from the blocked call. In other embodiments, the button 303 may be disabled as well so that the user cannot screen the blocked call either. The incoming call can be screened by various techniques to evaluate the characteristics of the calling entity. Exemplary screening techniques may include the user screening a message being recorded on an answering machine or voice mail, the user checking a caller ID display to see who or where the call is from, and the user checking the time or date which a call or message was received. Exemplary screening techniques may also include connecting the calling party to a chatbot service such that the chatbot service may screen the calling party and/or record the conversion. In implementations, screening may be performed by protocols such as Secure Telephony Identity Revisited (STIR), Signature-based Handling of Asserted information using tokens (SHAKEN) to identify calls associated with spoofed phone numbers, and the like.

Further, the user may perform other actions upon the incoming call in addition to or in place of those illustrated in FIG. 3A. For example, the user can interact with the GUI 301 to decline the incoming call while it is still being blocked, report the phone number included in the alert 302 to a server (e.g., the server computing device 106 of FIG. 1) or log locally as associated with a fraudulent entity without screening the call or after screening the call, report the phone number or log locally as associated with a fraudulent entity after selecting the button 308 to answer the call, report the phone number or log locally as not associated with a fraudulent entity after selecting the button 308 to answer the call, and the like. In one embodiment, the application that blocks the incoming call during the lifetime of the valid session interaction parameter may display no GUI or notification to the user when an incoming call is being blocked from being answered by the user. That is, the application may be configured to block identified incoming calls as a background executing process without a visible GUI. In some embodiments, when the user interacts with the button 308 to answer the incoming call alerted as session interaction parameter sensitive.

FIG. 3B illustrates an exemplary GUI 351 of the application for notifying the user of an incoming call currently being silenced. The GUI 351 may include an alert 352 and a set of buttons 303, 305, and 308 for the user to select. Here, the alert 352 may be similar to the alert 302 of FIG. 3A, notifying the user that the incoming call has been identified as an session interaction parameter sensitive call. The alert 302 may include the phone number of the calling entity, i.e., "1-347-000-0000," and "New York" as the area associated with the phone number's area code. The difference here is that, at GUI 351, instead of blocking, the application is actively silencing the incoming call. In some embodiments, the application may silence the incoming call regardless of the setting already configured with regard to the phone functionality on the device (e.g., the user may not have set the mobile device in silence mode, and the application can overwrite the setting specifically for the identified incoming calls).

Here, at GUI 351, when the application of the application is actively silencing the incoming call in protection against the detected/potential vishing attack against the valid session interaction parameter, the user nevertheless can also interact with the selectable options to perform actions with regard to the pending incoming call. In this example, the user can also select the button 303 to screen the silenced call, select the button 305 to reply with a message, or select the button 308 to swipe up to answer the incoming call. The incoming call can be screened by various techniques to evaluate the characteristics of the calling entity as described above.

Further, the user may also perform other actions upon the incoming call in addition to or in place of those illustrated in FIG. 3B. For example, the user can interact with the GUI 351 to decline the incoming call while it is being silenced, report the phone number included in the alert 352 to the server (e.g., the server computing device 106 of FIG. 1) or log it locally as associated with a fraudulent entity without screening the call or after screening the call, report or log locally the phone number as associated with a fraudulent entity after selecting the button 308 to answer the call, report or log locally the phone number as not associated with a fraudulent entity after selecting the button 308 to answer the call, and the like. In some embodiments, when the user interacts with the button 308 to answer the incoming call alerted as session interaction parameter sensitive.

FIG. 3C illustrates an exemplary GUI 381 for notifying the user of an incoming call via a negative user interface. The GUI 381 may include an alert 382 and a set of buttons 303, 385, and 388 for the user to select. Here, the alert 382 may be similar to the alert 302 of FIG. 3A and the alert 352 of FIG. 3B, notifying the user that the incoming call has been identified as an OTP sensitive call. The alert 382 may include the phone number of the calling entity, i.e., "1-347-000-0000," and "New York" as the area associated with the phone number's area code. The difference here is that, at GUI 381, instead of blocking or silencing, the application is actively providing negative UIs in association with the incoming call. As illustrated in this embodiment, the button 355 may be rendered as un-selectable, as indicated by the exemplary dashed messaging icon and dashed label "Reply." Similarly, the button 388 may be rendered un-selectable, as indicated by the exemplary dashed label "Swipe Up to Answer."

Here, at GUI 381 of the application, unlike the GUIs 301 and 351, when the application is actively providing the negative UIs for the incoming call in protection against the detected/potential vishing attack against the valid session interaction parameter, the user can only interact with the regularly rendered UI elements (e.g., the button 303 is still available for the user to screen the incoming call), but no longer able to select the UI elements rendered negative, e.g., select the button 305 to reply with a message, or select the button 308 to swipe up to answer the incoming call.

Further, the user may also perform other actions upon the incoming call in addition to or in place of those illustrated in FIG. 3C, if the corresponding UI elements are provided at the GUI 381. For example, the user can interact with the GUI 381 to decline the incoming call, report the phone number included in the alert 382 to the server (e.g., the server computing device 106 of FIG. 1) or log locally as associated with a fraudulent entity without screening the call or after screening the call, and the like. In this example, without an operable button 388, the user may be prevented from answering the incoming call as he or she may still be able to at the GUIs 301 or 351.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; knowledge corpus; stored audio recordings; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not of limitation, the term "server" can refer to a single, physical processor with associated communications and data storage and database facilities, or it can refer to a networked or clustered complex of processors and associated network and storage devices, as well as operating software and one or more database systems and application software that support the services provided by the server. In some embodiments, the server may store transactions and dynamically trained machine learning models. Cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a social media post, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) FreeBSD™, NetBSD™, OpenBSD™; (2) Linux™; (3) Microsoft Windows™; (4) OS X (MacOS)™; (5) MacOS 11 ™; (6) Solaris™; (7) Android™; (8) iOS™; (9) Embedded Linux™; (10) Tizen™; (11) WebOS™; (12) IBM i™; (13) IBM AIX™; (14) Binary Runtime Environment for Wireless (BREW)™; (15) Cocoa (API)™; (16) Cocoa Touch™; (17) Java Platforms™; (18) JavaFX™; (19) JavaFX Mobile; ™ (20) Microsoft DirectX™; (21) NET Framework™; (22) Silverlight™; (23) Open Web Platform™; (24) Oracle Database™; (25) Qt™; (26) Eclipse Rich Client Platform™; (27) SAP NetWeaver™; (28) Smartface™; and/or (29) Windows Runtime™.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device. In at least one embodiment, the exemplary ASR system of the present disclosure, utilizing at least one machine-learning model described herein, may be referred to as exemplary software.

In some embodiments, exemplary inventive computer-based systems/platforms, exemplary inventive computer-based devices, and/or exemplary inventive computer-based components of the present disclosure may be configured to handle numerous concurrent transactions/users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, the exemplary ASR system of the present disclosure, utilizing at least one machine-learning model described herein, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™ Pager, Smartphone, or any other reasonable mobile electronic device.

In some embodiments, the exemplary inventive computer-based systems/platforms, the exemplary inventive computer-based devices, and/or the exemplary inventive computer-based components of the present disclosure may be configured to securely store and/or transmit data (e.g., tokenized PAN numbers, etc.) by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

Figure 4:
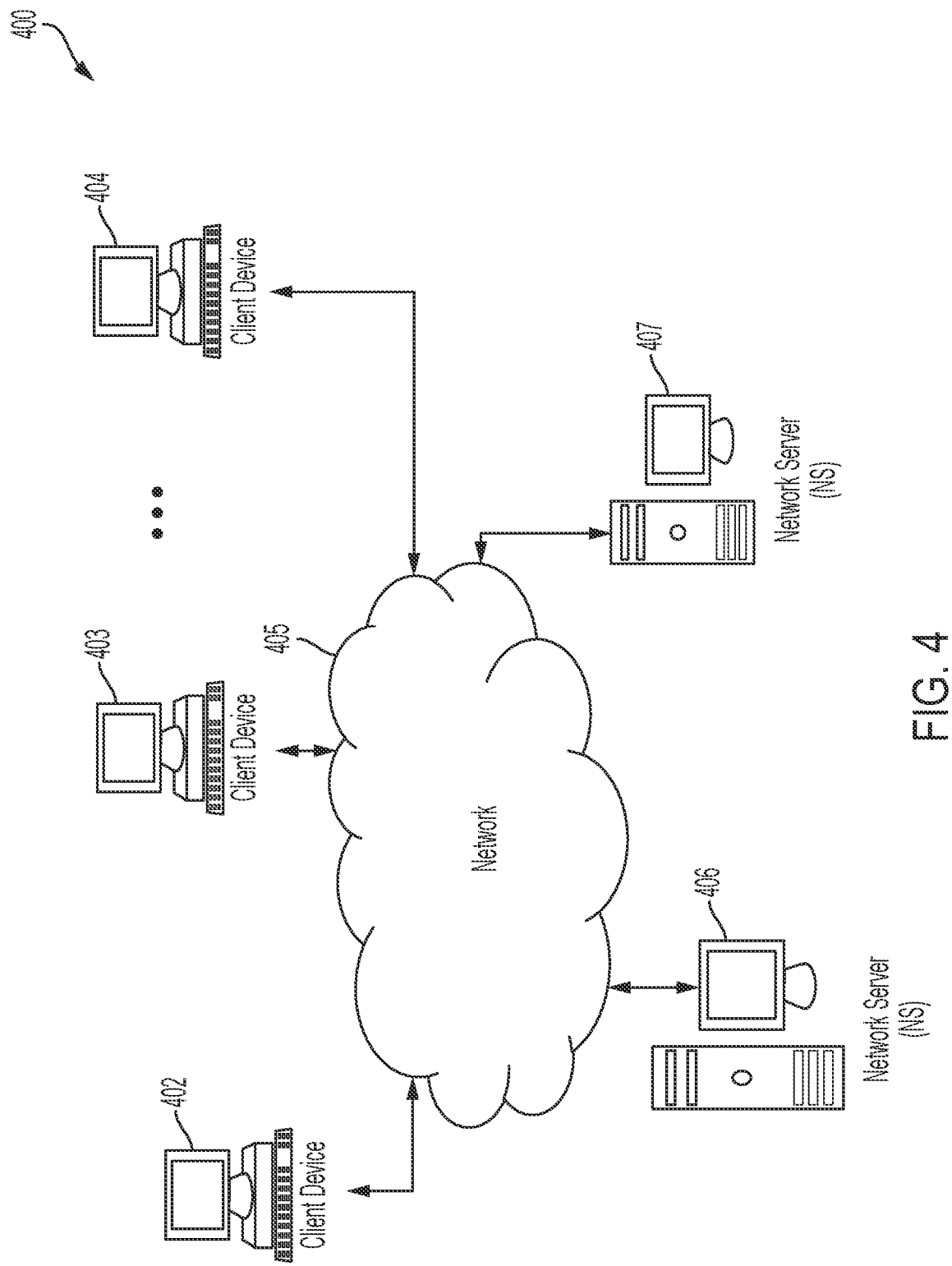
FIG. 4 depicts a block diagram of an exemplary computer-based system/platform in accordance with one or more embodiments of the present disclosure.

FIG. 4 depicts a block diagram of an exemplary computer-based system/platform 400 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform 400 may be configured to manage a large number of members and/or concurrent transactions, as detailed herein. In some embodiments, the exemplary computer-based system/platform 400 may be based on a scalable computer and/or network architecture that incorporates varies strategies for assessing the data, caching, searching, and/or database connection pooling. An example of the scalable architecture is an architecture that is capable of operating multiple servers. In some embodiments, the exemplary inventive computing devices and/or the exemplary inventive computing components of the exemplary computer-based system/platform 400 may be configured to manage the exemplary ASR system of the present disclosure, utilizing at least one machine-learning model described herein.

In some embodiments, referring to FIG. 4, members 402-404 (e.g., clients) of the exemplary computer-based system/platform 400 may include virtually any computing device capable of receiving and sending a message over a network (e.g., cloud network), such as network 405, to and from another computing device, such as servers 406 and 407, each other, and the like. In some embodiments, the member devices 402-404 may be personal computers, multiprocessor systems, microprocessor-based or programmable consumer electronics, network PCs, and the like. In some embodiments, one or more member devices within member devices 402-404 may include computing devices that connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 402-404 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 402-404 may include may run one or more applications, such as Internet browsers, mobile applications, voice calls, video games, videoconferencing, and email, among others. In some embodiments, one or more member devices within member devices 402-404 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 402-404 may be specifically programmed by either Java, .Net, QT, C, C++ and/or other suitable programming language. In some embodiments, one or more member devices within member devices 402-404 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 405 may provide network access, data transport and/or other services to any computing device coupled to it. In some embodiments, the exemplary network 405 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 405 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 405 may include and implement, as an alternative or in conjunction with one or more of the above, a WiMAX architecture defined by the WiMAX forum. In some embodiments and, optionally, in combination of any embodiment described above or below, the exemplary network 405 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 405 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 405 may also include mass storage, such as network attached storage (NAS), a storage area network (SAN), a content delivery network (CDN) or other forms of computer or machine readable media.

In some embodiments, the exemplary server 406 or the exemplary server 407 may be a web server (or a series of servers) running a network operating system, examples of which may include but are not limited to Microsoft Windows Server, Novell NetWare, or Linux. In some embodiments, the exemplary server 406 or the exemplary server 407 may be used for and/or provide cloud and/or network computing. Although not shown in FIG. 4, in some embodiments, the exemplary server 406 or the exemplary server 407 may have connections to external systems like email, SMS messaging, text messaging, ad content providers, etc. Any of the features of the exemplary server 406 may be also implemented in the exemplary server 407 and vice versa.

In some embodiments, one or more of the exemplary servers 406 and 407 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 401-404.

In some embodiments and, optionally, in combination of any embodiment described above or below, for example, one or more exemplary computing member devices 402-404, the exemplary server 406, and/or the exemplary server 407 may include a specifically programmed software module that may be configured to send, process, and receive information (e.g., transactions, VCNs, etc.) using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 5:
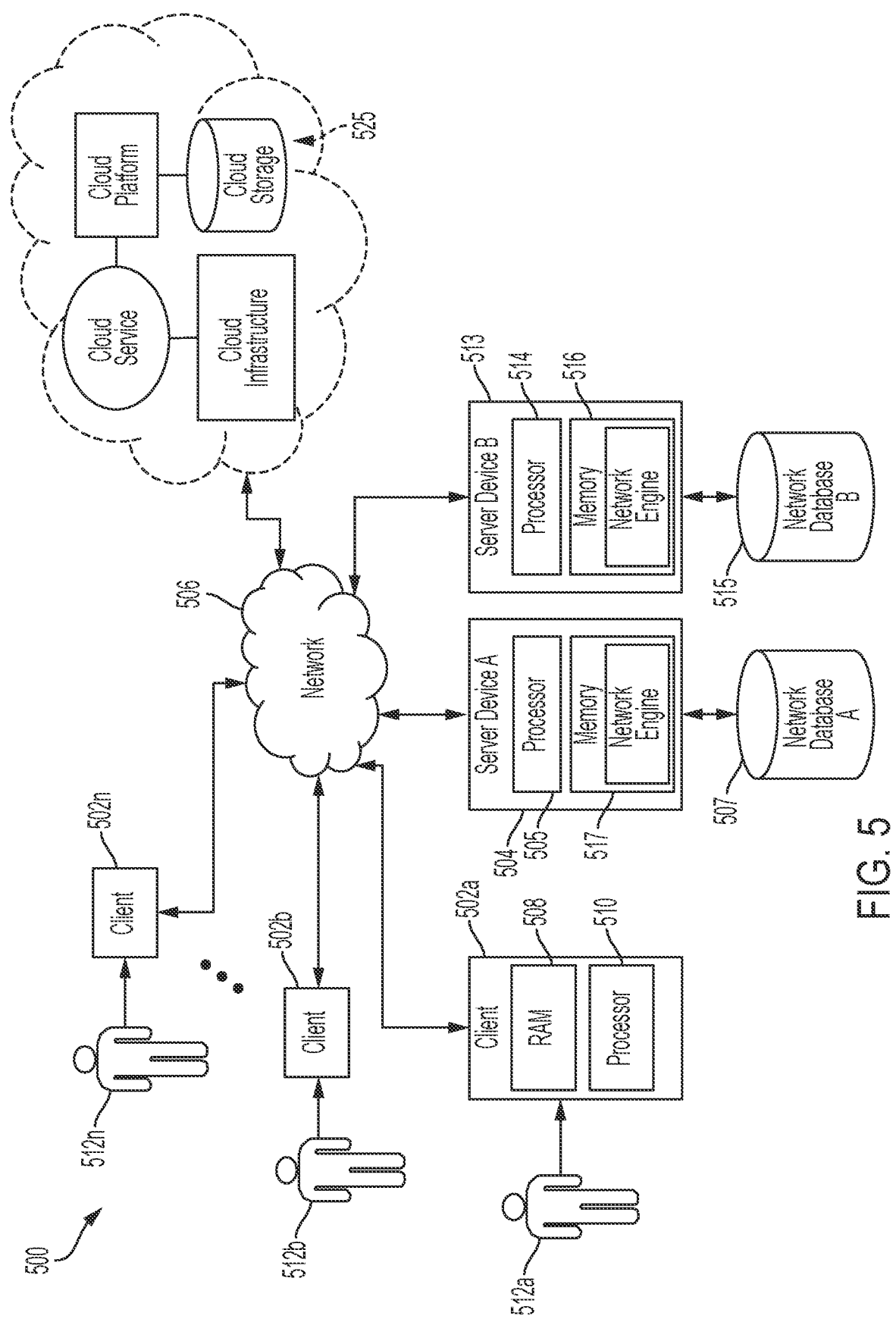
FIG. 5 depicts a block diagram of another exemplary computer-based system/platform in accordance with one or more embodiments of the present disclosure.

FIG. 5 depicts a block diagram of another exemplary computer-based system/platform 500 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 502a, 502b thru 502n shown each at least includes a computer-readable medium, such as a random-access memory (RAM) 508 coupled to a processor 510 or FLASH memory. In some embodiments, the processor 510 may execute computer-executable program instructions stored in memory 508. In some embodiments, the processor 510 may include a microprocessor, an ASIC, and/or a state machine. In some embodiments, the processor 510 may include, or may be in communication with, media, for example computer-readable media, which stores instructions that, when executed by the processor 510, may cause the processor 510 to perform one or more steps described herein. In some embodiments, examples of computer-readable media may include, but are not limited to, an electronic, optical, magnetic, or other storage or transmission device capable of providing a processor, such as the processor 510 of client 502a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 502a through 502n may also comprise a number of external or internal devices such as a mouse, a CD-ROM, DVD, a physical or virtual keyboard, a display, a speaker, or other input or output devices. In some embodiments, examples of member computing devices 502a through 502n (e.g., clients) may be any type of processor-based platforms that are connected to a network 506 such as, without limitation, personal computers, digital assistants, personal digital assistants, smart phones, pagers, digital tablets, laptop computers, Internet appliances, and other processor-based devices. In some embodiments, member computing devices 502a through 502n may be specifically programmed with one or more application programs in accordance with one or more principles/methodologies detailed herein. In some embodiments, member computing devices 502a through 502n may operate on any operating system capable of supporting a browser or browser-enabled application, such as Microsoft™ Windows™, and/or Linux. In some embodiments, member computing devices 502a through 502n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 502a through 502n, users, 512a through 512n, may communicate over the exemplary network 506 with each other and/or with other systems and/or devices coupled to the network 506. As shown in FIG. 5, exemplary server devices 504 and 513 may be also coupled to the network 506. Exemplary server device 504 may include a processor 505 coupled to a memory that stores a network engine 517. Exemplary server device 513 may include a processor 514 coupled to a memory 516 that stores a network engine. In some embodiments, one or more member computing devices 502a through 502n may be mobile clients. As shown in FIG. 5, the network 506 may be coupled to a cloud computing/architecture(s) 525. The cloud computing/architecture(s) 525 may include a cloud service coupled to a cloud infrastructure and a cloud platform, where the cloud platform may be coupled to a cloud storage.

In some embodiments, at least one database of exemplary databases 507 and 515 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 6:
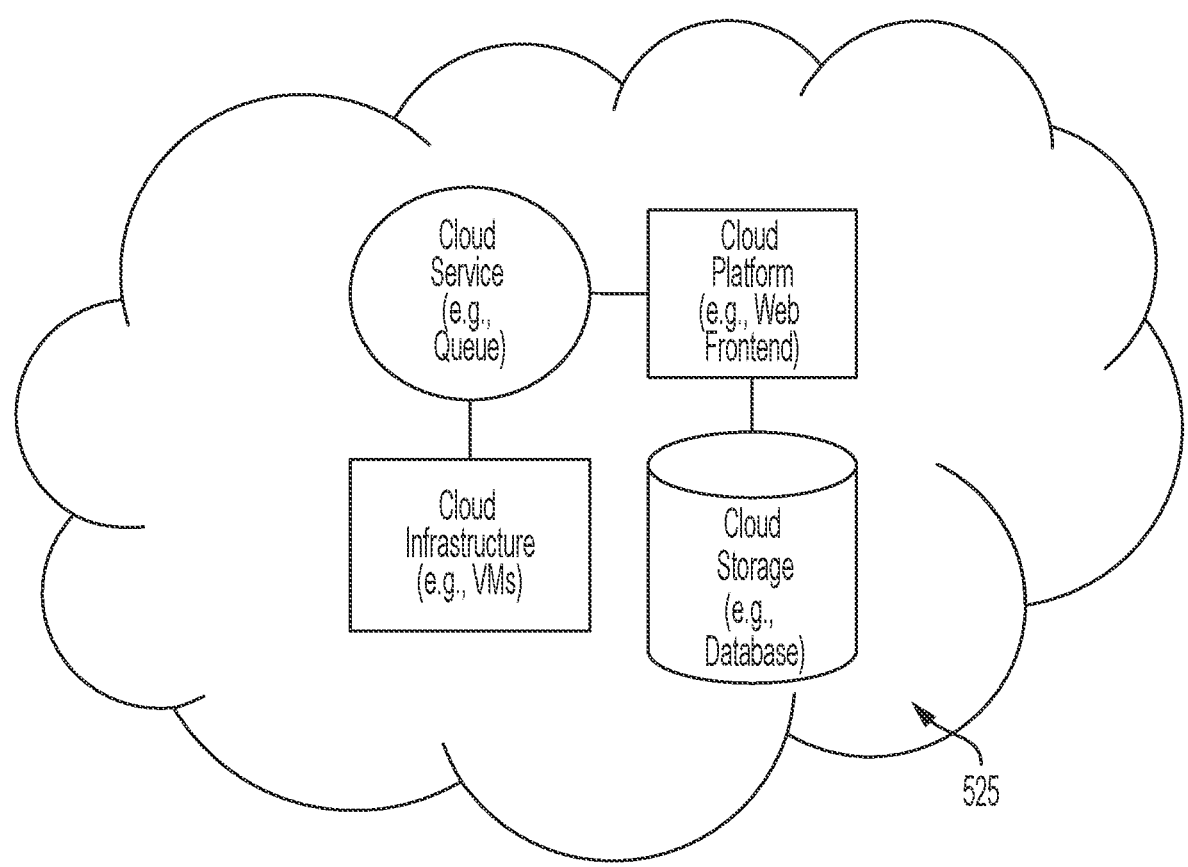
FIGS. 6 and 7 are diagrams illustrating implementations of cloud computing architecture/aspects with respect to which the disclosed technology may be specifically configured to operate, in accordance with one or more embodiments of the present disclosure.
Figure 7:
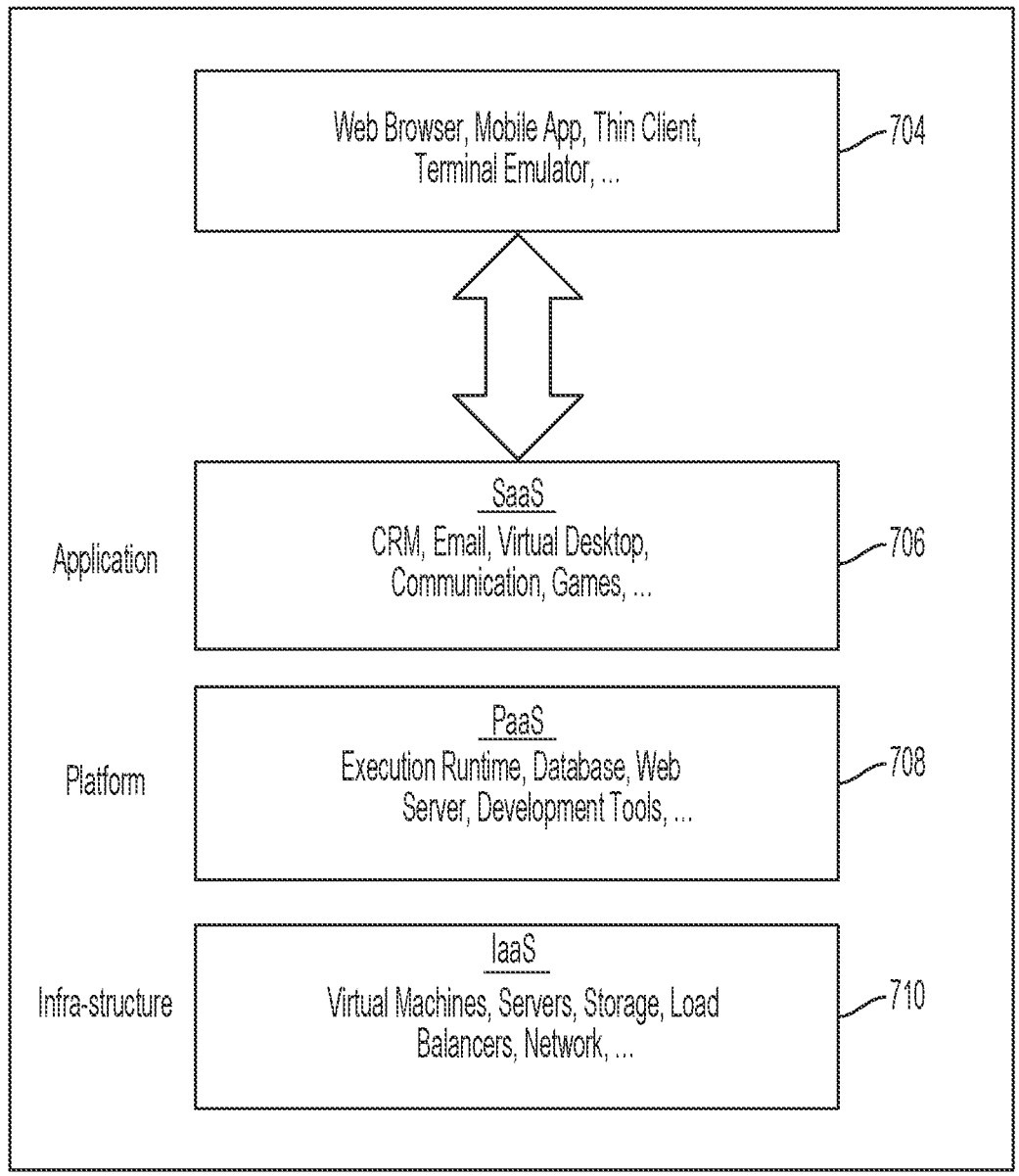

FIG. 6 and FIG. 7 illustrate schematics of exemplary implementations of the cloud computing/architecture(s) in which the exemplary inventive computer-based systems/platforms, the exemplary inventive computer-based devices, and/or the exemplary inventive computer-based components of the present disclosure may be specifically configured to operate. FIG. 6 illustrates an expanded view of the cloud computing/architecture(s) 525 found in FIG. 5. FIG. 7. illustrates the exemplary inventive computer-based components of the present disclosure may be specifically configured to operate in the cloud computing/architecture 525 as a source database 704, where the source database 704 may be a web browser. a mobile application, a thin client, and a terminal emulator. In FIG. 7, the exemplary inventive computer-based systems/platforms, the exemplary inventive computer-based devices, and/or the exemplary inventive computer-based components of the present disclosure may be specifically configured to operate in an cloud computing/ architecture such as, but not limiting to: infrastructure a service (IaaS) 710, platform as a service (PaaS) 708, and/or software as a service (SaaS) 706.

In some embodiments, the exemplary inventive computer-based systems/platforms, the exemplary inventive computer-based devices, and/or the exemplary inventive computer-based components of the present disclosure may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, an artificial recurrent neural network model, a long short-term memory ("LSTM") model, and a distributed long short-term memory ("DLSTM") model, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:
  i) Define Neural Network architecture/model,
  ii) Transfer the input data to the exemplary neural network model,
  iii) Train the exemplary model incrementally,
  iv) determine the accuracy for a specific number of timesteps,
  v) apply the exemplary trained model to process the newly-received input data,
  vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

At least some aspects of the present disclosure will now be described with reference to the following numbered clauses.

1. A method may include:
    instructing, by at least one processor of a first computing device, a second computing device associated with a user, to obtain, via at least one graphical user interface (GUI) having at least one programmable GUI element, a permission from the user to monitor a plurality of activities executed within the second computing device;

instructing, by the at least one processor of the first computing device, in response to obtaining the permission from the user, the second computing device to monitor the plurality of activities executed within the second computing device for a predetermined period of time;

receiving, by the at least one processor of the first computing device, from the second computing device, an indication of an incoming interaction session being initiated with the user within the predetermined period of time;

automatically verifying, by the at least one processor of the first computing device, from the second computing device, at least one session interaction parameter associated with the incoming interaction session to identify the incoming interaction session as a suspect interaction session;

determining, by the at least one processor of the first computing device, when a duration of time associated with the suspect interaction session meets or exceeds a predetermined duration threshold;

utilizing, by the at least one processor of the first computing device, a trained detection machine learning model, when the duration of time associated with the suspect interaction session meets or exceeds the predetermined duration threshold, to identify at least one future activity subsequent to the suspect interaction session based on at least one first pre-determined type activity that is associated with the user and identified within the duration of time of the suspect interaction session; and automatically instructing, by the at least one processor of the first computing device, the first computing device to halt the at least one future activity, based on the at least one session interaction parameter of the suspect interaction session and at least one pre-determined trigger parameter.

2. The method according to clause 1, where the indication of the incoming interaction session being initiated with the user is an indication of an incoming phone call, received from a telephonic module of the computing device.

3. The method according to clause 1 or 2, where the at least one session interaction parameter is a session initiation protocol ("SIP") certificate associated with the suspect interaction session.

4. The method according to clause 1, 2, or 3, where utilizing the trained detection machine learning model to model the confidence value associated with the suspect interaction session includes identifying at least one transaction associated with at least one gift card of a predetermined value.

5. The method according to clause 1, 2, 3, or 4, where the at least one session interaction parameter of the incoming interaction session is not associated with at least one of a particular entity, a particular individual, or a particular physical location based on a database of known session interaction parameters.

6. The method according to clause 1, 2, 3, 4, or 5, further including storing a plurality of transactions associated with the user within the first computing device.

7. The method according to clause 1, 2, 3, 4, 5, or 6, where the future activity is a transaction using a gift card associated with the at least one first predetermined type activity by a different user.

8. The method according to clause 1, 2, 3, 4, 5, 6, or 7, where the at least one predetermined trigger parameter is a frequency of transactions associated with the at least one first predetermined type activity.

9. A method may include:

instructing, by at least one processor of a first computing device, a second computing device associated with a user, to obtain, via at least one graphical user interface (GUI) having at least one programmable GUI element, a permission from the user to monitor a plurality of activities executed within the second computing device;

instructing, by the at least one processor of the first computing device, in response to obtaining the permission from the user, the second computing device to continuously monitor the plurality of activities executed within the computing device for a predetermined period of time;

receiving, by the at least one processor of the first computing device, from the second computing device, an indication of an incoming interaction session being initiated with the user within the predetermined period of time;

automatically verifying, by the at least one processor of the first computing device, from the second computing device, at least one session interaction parameter associated with the incoming interaction session to identify the incoming interaction session as a suspect interaction session when the at least one session interaction parameter of the incoming interaction session is not associated with at least one of a particular entity, a particular individual, or a particular physical location based on a database of known session interaction parameters;

determining, by the at least one processor of the first computing device, when a duration of time associated with the suspect interaction session meets or exceeds a predetermined duration threshold;

utilizing, by the at least one processor of the first computing device, a trained detection machine learning model, when the duration of time associated with the suspect interaction session meets or exceeds the predetermined duration threshold, to model a confidence value associated with the suspect interaction session based on at least one first pre-determined type activity that is associated with the user and identified within the duration of time of the suspect interaction session;

identifying, by the at least one processor of the first computing device, in response to the confidence value score meeting or exceeding a pre-determined confidence threshold, at least one future activity subsequent to the suspect interaction session, wherein the at least one future activity is a second pre-determined type activity and related to the at least one first pre-determined type activity;

automatically instructing, by the at least one processor of the first computing device, the first computing device to halt the at least one future activity, based on the at least one session interaction parameter of the suspect interaction session and at least one pre-determined trigger parameter; and storing, by the at least one processor of the first computing device, a plurality of predetermined type activities associated with the suspect interaction session within the second computing device.

10. The method according to clause 9, where the indication of the incoming interaction session being initiated with the user is an indication of an incoming phone call, received from a telephonic module of the first computing device.

11. The method according to clause 9 or 10, where the at least one session interaction parameter is a session initiation protocol ("SIP") certificate associated with the suspect interaction session.

12. The method according to clause 9, 10, or 11, where utilizing the trained detection machine learning model to model the confidence value associated with the suspect interaction session includes identifying at least one transaction associated with at least one gift card of a predetermined value.

13. The method according to clause 9, 10, 11, or 12, where the second computing device is a server computing device.

14. The method according to clause 9, 10, 11, 12, or 13, where the future activity is a transaction using a gift card associated with the at least one first predetermined type activity by a different user.

15. The method according to clause 9, 10, 11, 12, 13, or 14, where the at least one predetermined trigger parameter is a frequency of transactions associated with the at least one first predetermined type activity.

16. A system may include:
   a non-transient computer memory, storing software instructions;
   at least one processor of a first computing device associated with a user;
   wherein, when the at least one processor executes the software instructions,
   the first computing device is programmed to:
      instruct, by at least one processor of a first computing device, a second computing device associated with a user, to obtain, via at least one graphical user interface (GUI) having at least one programmable GUI element, a permission from the user to monitor a plurality of activities executed within the second computing device;
      instruct, by the at least one processor of the first computing device, in response to obtaining the permission from the user, the second computing device to continuously monitor the plurality of activities executed within the computing device for a predetermined period of time;
      receive, by the at least one processor of the first computing device, from the second computing device, an indication of an incoming interaction session being initiated with the user within the predetermined period of time;
      automatically verify, by the at least one processor of the first computing device, from the second computing device, at least one session interaction parameter associated with the incoming interaction session to identify the incoming interaction session as a suspect interaction session when the at least one session interaction parameter of the incoming interaction session is not associated with at least one of a particular entity, a particular individual, or a particular physical location based on a database of known session interaction parameters;
      determine, by the at least one processor of the first computing device, when a duration of time associated with the suspect interaction session meets or exceeds a predetermined duration threshold;
      utilize, by the at least one processor of the first computing device, a trained detection machine learning model, when the duration of time associated with the suspect interaction session meets or exceeds the predetermined duration threshold, to model a confidence value associated with the suspect interaction session based on at least one first pre-determined type activity that is associated with the user and identified within the duration of time of the suspect interaction session;
      identify, by the at least one processor of the first computing device, in response to the confidence value score meeting or exceeding a pre-determined confidence threshold, at least one future activity subsequent to the suspect interaction session, wherein the at least one future activity is a second pre-determined type activity and related to the at least one first pre-determined type activity; and
      automatically instruct, by the at least one processor of the first computing device, the first computing device to halt the at least one future activity, based on the at least one session interaction parameter of the suspect interaction session and at least one pre-determined trigger parameter.

17. The system according to clause 16, where the indication of the incoming interaction session being initiated with the user is an indication of an incoming phone call, received from a telephonic module of the first computing device.

18. The system according to clause 16, or 17, where the at least one session interaction parameter is a session initiation protocol ("SIP") certificate associated with the suspect interaction session.

19. The system according to clause 16, 17, or 18, where utilizing the trained detection machine learning model to model the confidence value associated with the suspect interaction session includes identifying at least one transaction associated with at least one gift card of a predetermined value.

20. The system according to clause 16, 17, 18, or 19, where the second computing device is a server computing device.

Publications cited throughout this document are hereby incorporated by reference in their entirety. While one or more embodiments of the present disclosure have been described, it is understood that these embodiments are illustrative only, and not restrictive, and that many modifications may become apparent to those of ordinary skill in the art, including that various embodiments of the inventive methodologies, the illustrative systems and platforms, and the illustrative devices described herein can be utilized in any combination with each other. Further still, the various steps may be carried out in any desired order (and any desired steps may be added and/or any desired steps may be eliminated).

What is claimed is:
1. A computer-implemented method comprising:
   instructing, by at least one processor of a first computing device, a second computing device associated with a user, to obtain, via at least one graphical user interface (GUI) having at least one programmable GUI element, a permission from the user to monitor a plurality of activities executed within the second computing device;
   instructing, by the at least one processor of the first computing device, in response to obtaining the permission from the user, the second computing device to monitor the plurality of activities executed within the second computing device for a predetermined period of time;

receiving, by the at least one processor of the first computing device, from the second computing device, an indication of an incoming interaction session being initiated with the user within the predetermined period of time;

automatically verifying, by the at least one processor of the first computing device, from the second computing device, at least one session interaction parameter associated with the incoming interaction session to identify the incoming interaction session as a suspect interaction session;

determining, by the at least one processor of the first computing device, when a duration of time associated with the suspect interaction session meets or exceeds a predetermined duration threshold;

utilizing, by the at least one processor of the first computing device, a trained detection machine learning model, when the duration of time associated with the suspect interaction session meets or exceeds the predetermined duration threshold, to identify at least one future activity subsequent to the suspect interaction session based on at least one first pre-determined type activity that is associated with the user and identified within the duration of time of the suspect interaction session; and automatically instructing, by the at least one processor of the first computing device, the first computing device to halt the at least one future activity, based on the at least one session interaction parameter of the suspect interaction session and at least one pre-determined trigger parameter.

2. The computer-implemented method of claim 1, wherein the indication of the incoming interaction session being initiated with the user is an indication of an incoming phone call, received from a telephonic module of the computing device.

3. The computer-implemented method of claim 1, wherein the at least one session interaction parameter is a session initiation protocol ("SIP") certificate associated with the suspect interaction session.

4. The computer-implemented method of claim 1, wherein utilizing the trained detection machine learning model to model the confidence value associated with the suspect interaction session comprises identifying at least one transaction associated with at least one gift card of a predetermined value.

5. The computer-implemented method of claim 1, wherein the at least one session interaction parameter of the incoming interaction session is not associated with at least one of a particular entity, a particular individual, or a particular physical location based on a database of known session interaction parameters.

6. The computer-implemented method of claim 5, further comprising storing a plurality of transactions associated with the user within the first computing device.

7. The computer-implemented method of claim 1, wherein the future activity is a transaction using a gift card associated with the at least one first predetermined type activity by a different user.

8. The computer-implemented method of claim 1, wherein the at least one predetermined trigger parameter is a frequency of transactions associated with the at least one first predetermined type activity.

9. A computer-implemented method comprising:
instructing, by at least one processor of a first computing device, a second computing device associated with a user, to obtain, via at least one graphical user interface (GUI) having at least one programmable GUI element, a permission from the user to monitor a plurality of activities executed within the second computing device;

instructing, by the at least one processor of the first computing device, in response to obtaining the permission from the user, the second computing device to continuously monitor the plurality of activities executed within the computing device for a predetermined period of time;

receiving, by the at least one processor of the first computing device, from the second computing device, an indication of an incoming interaction session being initiated with the user within the predetermined period of time;

automatically verifying, by the at least one processor of the first computing device, from the second computing device, at least one session interaction parameter associated with the incoming interaction session to identify the incoming interaction session as a suspect interaction session when the at least one session interaction parameter of the incoming interaction session is not associated with at least one of a particular entity, a particular individual, or a particular physical location based on a database of known session interaction parameters;

determining, by the at least one processor of the first computing device, when a duration of time associated with the suspect interaction session meets or exceeds a predetermined duration threshold;

utilizing, by the at least one processor of the first computing device, a trained detection machine learning model, when the duration of time associated with the suspect interaction session meets or exceeds the predetermined duration threshold, to model a confidence value associated with the suspect interaction session based on at least one first pre-determined type activity that is associated with the user and identified within the duration of time of the suspect interaction session;

identifying, by the at least one processor of the first computing device, in response to the confidence value score meeting or exceeding a pre-determined confidence threshold, at least one future activity subsequent to the suspect interaction session, wherein the at least one future activity is a second pre-determined type activity and related to the at least one first pre-determined type activity;

automatically instructing, by the at least one processor of the first computing device, the first computing device to halt the at least one future activity, based on the at least one session interaction parameter of the suspect interaction session and at least one pre-determined trigger parameter; and storing, by the at least one processor of the first computing device, a plurality of predetermined type activities associated with the suspect interaction session within the second computing device.

10. The computer-implemented method of claim 9, wherein the indication of the incoming interaction session being initiated with the user is an indication of an incoming phone call, received from a telephonic module of the first computing device.

11. The computer-implemented method of claim 9, wherein the at least one session interaction parameter is a session initiation protocol ("SIP") certificate associated with the suspect interaction session.

12. The computer-implemented method of claim 9, wherein utilizing the trained detection machine learning model to model the confidence value associated with the suspect interaction session comprises identifying at least one transaction associated with at least one gift card of a predetermined value.

13. The computer-implemented method of claim 9, wherein the first computing device is a server computing device.

14. The computer-implemented method of claim 9, wherein the future activity is a transaction using a gift card associated with the at least one first predetermined type activity by a different user.

15. The computer-implemented method of claim 9, wherein the at least one predetermined trigger parameter is a frequency of transactions associated with the at least one first predetermined type activity.

16. A system comprising:
- a non-transient computer memory, storing software instructions;
- at least one processor of a first computing device associated with a user;
- wherein, when the at least one processor executes the software instructions,
  the first computing device is programmed to:
    - instruct, by at least one processor of a first computing device, a second computing device associated with a user, to obtain, via at least one graphical user interface (GUI) having at least one programmable GUI element, a permission from the user to monitor a plurality of activities executed within the second computing device;
    - instruct, by the at least one processor of the first computing device, in response to obtaining the permission from the user, the second computing device to continuously monitor the plurality of activities executed within the computing device for a predetermined period of time;
    - receive, by the at least one processor of the first computing device, from the second computing device, an indication of an incoming interaction session being initiated with the user within the predetermined period of time;
    - automatically verify, by the at least one processor of the first computing device, from the second computing device, at least one session interaction parameter associated with the incoming interaction session to identify the incoming interaction session as a suspect interaction session when the at least one session interaction parameter of the incoming interaction session is not associated with at least one of a particular entity, a particular individual, or a particular physical location based on a database of known session interaction parameters;
    - determine, by the at least one processor of the first computing device, when a duration of time associated with the suspect interaction session meets or exceeds a predetermined duration threshold;
    - utilize, by the at least one processor of the first computing device, a trained detection machine learning model, when the duration of time associated with the suspect interaction session meets or exceeds the predetermined duration threshold, to model a confidence value associated with the suspect interaction session based on at least one first pre-determined type activity that is associated with the user and identified within the duration of time of the suspect interaction session;
    - identify, by the at least one processor of the first computing device, in response to the confidence value score meeting or exceeding a pre-determined confidence threshold, at least one future activity subsequent to the suspect interaction session, wherein the at least one future activity is a second pre-determined type activity and related to the at least one first pre-determined type activity; and
    - automatically instruct, by the at least one processor of the first computing device, the first computing device to halt the at least one future activity, based on the at least one session interaction parameter of the suspect interaction session and at least one pre-determined trigger parameter.

17. The system of claim 16, wherein the indication of the incoming interaction session being initiated with the user is an indication of an incoming phone call, received from a telephonic module of the first computing device.

18. The system of claim 16, wherein the at least one session interaction parameter is a session initiation protocol ("SIP") certificate associated with the suspect interaction session.

19. The system of claim 16, wherein utilizing the trained detection machine learning model to model the confidence value associated with the suspect interaction session comprises identifying at least one transaction associated with at least one gift card of a predetermined value.

20. The system of claim 16, wherein the first computing device is a server computing device.

* * * * *